(No Model.)
A. LAMBOTTE.
PROCESS OF RECOVERING TIN FROM TIN PLATE AND OTHER MATERIALS.
No. 366,118. Patented July 5, 1887.
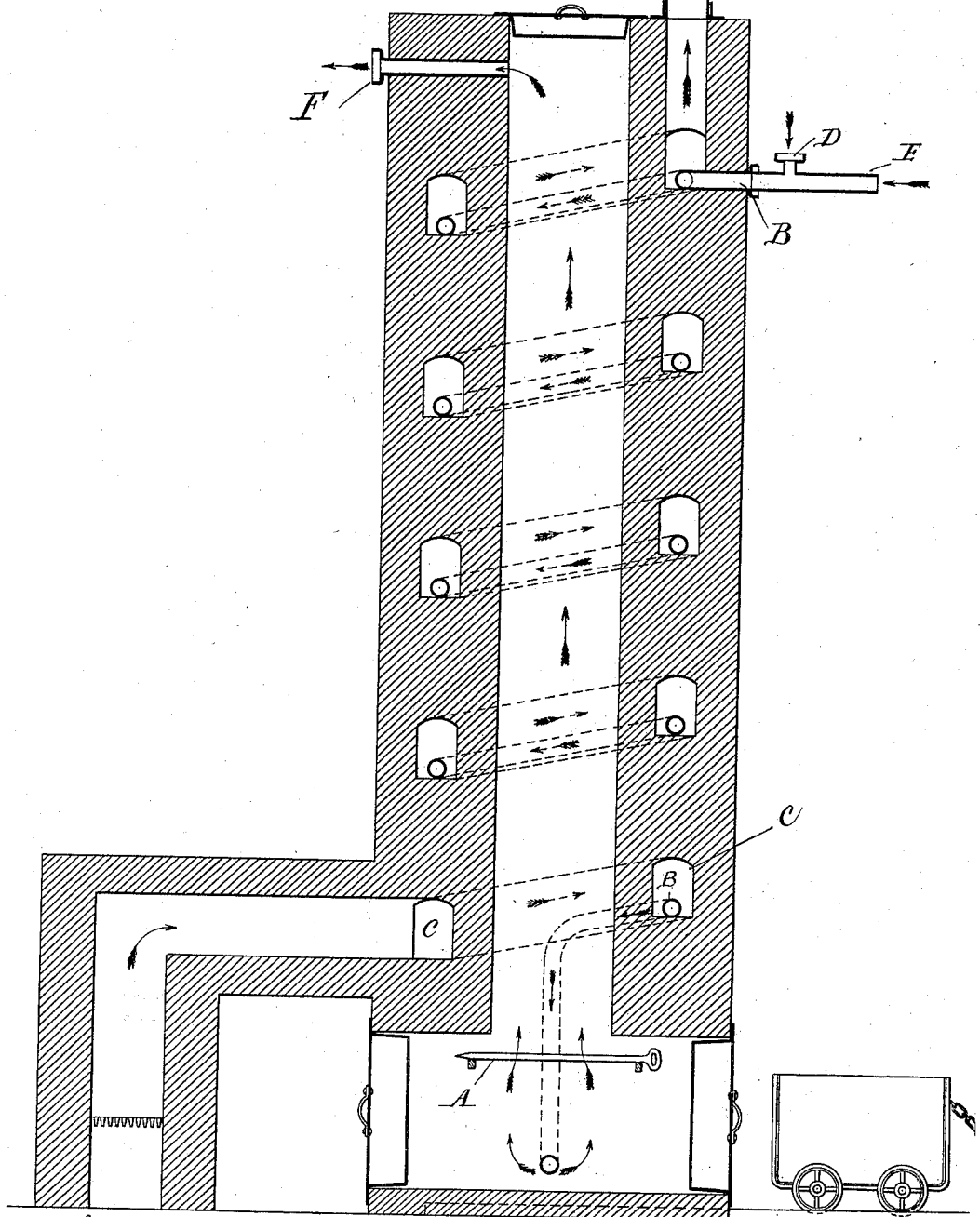

UNITED STATES PATENT OFFICE.

ALFRED LAMBOTTE, OF BRUSSELS, BELGIUM.

PROCESS OF RECOVERING TIN FROM TIN-PLATE AND OTHER MATERIALS.

SPECIFICATION forming part of Letters Patent No. 366,118, dated July 5, 1887.

Application filed November 24, 1884. Serial No. 148,748. (No specimens.) Patented in Belgium July 17, 1884, No. 65,793, August 23, 1884, No. 66,117, and October 16, 1884, No. 66,620; in France September 6, 1884, No. 164,151; in Germany September 12, 1884, No. 32,517; in England November 6, 1884, No. 14,672, and in Italy April 28, 1886, No. 19,836.

*To all whom it may concern:*

Be it known that I, ALFRED LAMBOTTE, vice-president of the Commercial Court of Brussels, residing at Brussels, in the Kingdom of Belgium, have invented a certain new and useful Process for the Recovery of Tin from Tin-Plate and other Materials Containing Tin— such as dross, oxidized metal, and residues— (for which I have obtained patents in Germany, September 12, 1884, No. 32,517; France, September 6, 1884, No. 164,151; Belgium, July 17, 1884, No. 65,793, August 23, 1884, No. 66,117, and October 16, 1884, No. 66,620; Great Britain, November 6, 1884, No. 14,672, and Italy April 28, 1886, No. 19,836;) and I do hereby declare that the following is a full, clear, and exact description of the invention, which will enable others skilled in the art to which it appertains to make and use the same.

This invention has for its object to recover tin from tinned iron, and more particularly from the waste of tin-plate; but the process is also applicable to any other material containing tin, such as dross, chippings, oxidized metal, and residues. According to circumstances, these materials may preponderate so as to form the principal part. By this process the two metals may be separated by means of chlorine gas in such manner that the iron is recovered ready for smelting and the tin in a particularly pure and commercially useful state free from iron. -

Attempts for separating tin from tin-plate by means of chlorine have been made without success. The principal difficulty in the application of chlorine consists in confining its effect to the tin alone without attacking the iron, and in preventing the formation of liquid stannic chloride, which acts on the iron, causing, under reduction to stannous chloride, the formation of ferrous chloride.

The present invention has for its object to avoid these drawbacks.

First. By causing the chlorine to act only in a highly-diluted state on the tinned material—that is to say, mixed with air or other like gases applied in such a manner that it does not attack the iron. This is carried out by conducting a continuous current of diluted chlorine gas over the surface of the material, so as to simultaneously carry off the vapors of stannic chloride which are generated, thereby preventing the close contact of the latter with the bare iron.

Second. By causing the chlorine to act at a temperature above the boiling-point of the stannic chloride, partly because the reaction is too much retarded in the cold, and, further, to prevent the condensation of the chloride.

Third. By employing the chlorine in a certain dry state.

A further peculiarity of this invention consists in the condensation of the vapors of stannic chloride, which takes place in such manner that the air or gas current charged with chloride vapor is charged with so much moisture after leaving the material as is necessary for producing hydrated or crystallized stannic chloride, which is more easily condensed than dry stannic chloride, or by conducting the current charged with chloride vapors through a more or less concentrated solution of stannic chloride. The latter forms a superior binding substance, and in this way the concentration of the solutions of stannic chloride may be automatically effected up to the point of complete saturation or beyond it.

In carrying out this invention I proceed as follows: The material to be untinned is introduced into a kind of cupola-furnace, or into stone towers or iron towers protected against radiation of heat, such as represented in the accompanying drawing, and which, for the purpose of continuous working, is provided with a movable grate, A, for removing the untinned material. The untinned material is removed below by a suitable motion of the grate-bars or other supports while fresh material is filled in from above. The chlorine gas, which is strongly diluted with air or other like gases, (the proportion being, say, from one to ten per cent. of chlorine gas to from ninety to ninety-nine per cent. of air,) sufficiently dried and heated to the temperature, say something over 120° centigrade, necessary for the reaction, is introduced at the lower part of the tower through the pipe B, which is located in the spiral smoke-flue C, and sucked through the mass of material, the chlorine being introduced in said pipe at D and the air at E. The vapors of stannic chloride generated are immediately carried off by the current through pipe F.

In order to recover crystallized salts directly from the vapors, the latter are charged in the upper part of the tower (left free for this purpose) with the water necessary for crystallization, in the shape of aqueous vapors. The deposit of the crystals takes place in spacious condensation-chambers specially arranged for the purpose; or the dry vapors are conducted into the condensation chambers, the walls of which are kept moist for the purpose of causing the formation of crystals. If it be not intended to recover the stannic chloride immediately as a crystallized salt, the air or gas currents charged with chloride vapors may be conducted through coke-towers irrigated with water, through a washing apparatus, or other appliances usually employed for similar purposes of absorption. In this case the condensation of the stannic chloride may be assisted by the addition of muriatic acid, or solutions of such chlorine compounds which form with stannic chloride technically useful double salts—for instance, sodic chloride and ammonium chloride. This last method serves at the same time to prevent the decomposition of the stannic chloride during the evaporation of the solutions obtained. It is also possible to cause the absorption of the stannic-chloride vapors by a solution of stannic chloride. The latter forms, until fully saturated, a highly-suitable binding substance, and permits an automatic and continuous condensation of the chloride vapors and the concentration of the obtained solutions by means of the methodical arrangements of apparatus generally used for such purposes.

For the purpose of crystallizing the stannic chloride contained in the solutions obtained the latter are evaporated by conducting a warm current of dry or nearly dry air through the same. By this process the water of the solution is removed without causing the decomposition of the stannic chloride. The concentration may also be caried out *in vacuo*.

The above-described process permits the utilization of the strongly-diluted gaseous chlorine obtained in various chemical processes, such as Dearon's, Weldon's, and Solvay's.

I am fully aware that it is not new to use heated chlorine gas for the purpose of recovering tin from tin scraps; and I am also aware that it has been proposed to force the chlorine gas and chloride of tin from the receptacle in which the operation is performed by means of dry air under pressure, and that heated air has been introduced into the receptacle for removing the bichloride which adheres to the iron and is not forced out by the first operation; but such is not the equivalent of my invention, nor do I wish to claim the same.

What I claim as new, and desire to secure by Letters Patent, is—

1. The method of recovering tin from tinned scraps, which consists in subjecting the same to a continuous current of chlorine gas diluted with air at a temperature above the boiling-point of stannic chloride, and then conducting the stannic-chloride vapors into a stannic chloride solution, substantially as set forth.

2. The process of recovering tin from tinned scraps, which consists in subjecting the same to a current of diluted chlorine gas at a temperature above the boiling-point of stannic chloride, and then conducting the stannic-chloride vapors into a stannic-chloride solution of medium strength for absorption, substantially as set forth.

3. The process of recovering tin from tinned scraps, which consists in subjecting said scraps to a current of diluted chlorine gas, dissolving the stannic-chloride vapors evolved, and subjecting the concentrated solution to a current of warm air for the separation of the crystals of stannic chloride, substantially as set forth.

In testimony whereof I have signed this specification in the presence of two subscribing witnesses.

ALFRED LAMBOTTE.

Witnesses:
EMILE PICARD,
GUSTAVE GUNS.